(12) United States Patent
Arnold et al.

(10) Patent No.: US 8,268,180 B2
(45) Date of Patent: Sep. 18, 2012

(54) METHODS OF FABRICATING LARGE-AREA, SEMICONDUCTING NANOPERFORATED GRAPHENE MATERIALS

(75) Inventors: Michael S. Arnold, Middleton, WI (US); Padma Gopalan, Madison, WI (US); Nathaniel S. Safron, Madison, WI (US); Myungwoong Kim, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 58 days.

(21) Appl. No.: 13/013,531

(22) Filed: Jan. 25, 2011

(65) Prior Publication Data

US 2011/0201201 A1 Aug. 18, 2011

Related U.S. Application Data

(60) Provisional application No. 61/298,302, filed on Jan. 26, 2010.

(51) Int. Cl.
*B31D 3/00* (2006.01)
(52) U.S. Cl. ............... 216/56; 216/41; 216/49; 216/81; 438/142; 438/198; 438/197; 438/655; 438/683
(58) Field of Classification Search .............. 216/41, 216/49, 56, 74, 81; 438/142, 198, 197, 655, 438/694, 683
See application file for complete search history.

(56) References Cited

U.S. PATENT DOCUMENTS

| | | | |
|---|---|---|---|
| 7,482,270 B2 | 1/2009 | Li et al. | |
| 2002/0123227 A1 | 9/2002 | Winningham et al. | |
| 2008/0182402 A1 | 7/2008 | Li et al. | |

FOREIGN PATENT DOCUMENTS

| WO | WO 2008061224 A1 | 5/2008 |
|---|---|---|
| WO | WO 2009/148679 | 12/2009 |

OTHER PUBLICATIONS

International Search Report and Written Opinion received in PCT/US2011/022393, Oct. 24, 2011.
Kim et al., Fabrication and Characterization of Large-Area, Semiconducting Nanoperforated Graphene Materials, Nano Letters, Mar. 1, 2010, vol. 10, No. 4, pp. 1125-1131.
Shen et al., Magnetoconductance oscillations in graphene antidot arrays, Applied Physics Letters, Sep. 22, 2008, pp. 1-3, vol. 93, No. 122102, American Institute of Physics.
Eroms et al., Weak localization and transport gap in graphene antidot lattices, New J. Phys., Sep. 16, 2009, vol. 11.
Yu et al., Collective Magnetic Behavior of Graphene Nanohole Superlattices, Nano Research, May 20, 2008, pp. 56-62, vol. 1, Tsinghua Press and Springer-Verlag.
Bai et al., Graphene nanomesh, Nature Nanotechnology, Feb. 14, 2010, Macmillan Publishers Limited.
Fürst et al., Electronic properties of graphene antidot lattices, New Journal of Physics, Sep. 30, 2009, vol. 11.

*Primary Examiner* — Nadine G Norton
*Assistant Examiner* — Maki Angadi
(74) *Attorney, Agent, or Firm* — Bell & Manning, LLC (57) ABSTRACT

Methods for forming a nanoperforated graphene material are provided. The methods comprise forming an etch mask defining a periodic array of holes over a graphene material and patterning the periodic array of holes into the graphene material. The etch mask comprises a pattern-defining block copolymer layer, and can optionally also comprise a wetting layer and a neutral layer. The nanoperforated graphene material can consist of a single sheet of graphene or a plurality of graphene sheets.

20 Claims, 8 Drawing Sheets

METHODS OF FABRICATING LARGE-AREA, SEMICONDUCTING NANOPERFORATED GRAPHENE MATERIALS

CROSS-REFERENCE TO RELATED APPLICATION

This application claims priority from U.S. provisional patent application Ser. No. 61/298,302, filed on Jan. 26, 2010, the entire contents of which are incorporated herein by reference.

STATEMENT REGARDING FEDERALLY SPONSORED RESEARCH OR DEVELOPMENT

This invention was made with government support under 0520527 and 0425880 awarded by the National Science Foundation. The government has certain rights in the invention.

BACKGROUND

Scientific and technological interest in graphene has rapidly grown recently because of the extraordinary electronic properties of the two-dimensional material. (See, Geim, A. K. *Science* 2009, 324, 1530-1534.) The mean free path for electron-phonon scattering in graphene is astonishingly long (>2 mm), and as a result, the room temperature electronic mobility in graphene could potentially exceed 200,000 cm$^2$ V$^{-1}$ s$^{-1}$ if scattering from disorder in the extrinsic environment were to be minimized. (See, Morozov, S. V.; Novoselov, K. S.; Katsnelson, M. I.; Schedin, F.; Elias, D. C.; Jaszczak, J. A.; Geim, A. K. *Phys. Rev. Lett.* 2008, 100, 016602; Chen, J. H.; Jang, C.; Xiao, S. D.; Ishigami, M.; Fuhrer, M. S. *Nat. Nanotechnol.* 2008, 3, 206-209.) Next-generation, ultrahigh performance electronics and transistor logic circuits are envisioned that exploit these exceptional properties. (See, Wang, X. R.; Ouyang, Y. J.; Li, X. L.; Wang, H. L.; Guo, J.; Dai, H. J. *Phys. Rev. Lett.* 2008, 100, 206803.) Other potential electronic applications of graphene as transparent conductors, sensors, and in flexible electronics have also been demonstrated and proposed. (See, Kim, K. S.; Zhao, Y.; Jang, H.; Lee, S. Y.; Kim, J. M.; Ahn, J. H.; Kim, P.; Choi, J. Y.; Hong, B. H. *Nature* 2009, 457, 706-710; Schedin, F.; Geim, A. K.; Morozov, S. V.; Hill, E. W.; Blake, P.; Katsnelson, M. I.; Novoselov, K. S. *Nature Mat.* 2007, 6, 652-655.)

Unfortunately, however, despite its excellent charge transport characteristics, the applicability of graphene in many electronic applications is currently limited because graphene does not have a technologically significant band gap >>kT. (See, Castro Neto, A. H.; Guinea, F.; Peres, N. M. R.; Novoselov, K. S.; Geim, A. K. *Rev. Mod. Phys.* 2009, 81, 109-162.) The insufficient band gap limits how strongly the conductance of graphene-based devices can be modulated by extrinsic or field-effect doping—which is a critically important behavior for semiconductor applications.

To address this problem, it has been shown that quantum confinement effects can be used to open up a band gap in graphene. For example, it has been demonstrated that the band gap of graphene nanoribbons, $E_g$, patterned using electron-beam lithography, roughly varies inversely with the width of the nanoribbons, w, according to $E_g$~0.2-1.5 eV-nm /w. (See, Castro Neto, A. H.; Guinea, F.; Peres, N. M. R.; Novoselov, K. S.; Geim, A. K. *Rev. Mod. Phys.* 2009, 81, 109-162; Stampfer, C.; Gutttinger, J.; Hellmueller, S.; Molitor, F.; Ensslin, K.; Ihn, T. *Phys. Rev. Lett.* 2009, 102, 056403; Yang, L.; Park, C. H.; Son, Y. W.; Cohen, M. L.; Louie, S. G. *Phys. Rev. Lett.* 2007, 99, 186801.) Other forms of nanostructured graphene showing semiconducting behavior have also been fabricated using electron-beam lithography, including graphene quantum dots. (See, Ponomarenko, L. A.; Schedin, F.; Katsnelson, M. I.; Yang, R.; Hill, E. W.; Novoselov, K. S.; Geim, A. K. *Science* 2008, 320, 356-358.) and inverse dot (See, Eroms, J.; Weiss, D. arXiv:0901.0840; Shen, T.; Wu, Y. Q.; Capano, M. A.; Rokhinson, L. P.; Engel, L. W.; Ye, P. D. *Appl. Phys. Lett.* 2008, 93, 122102.)

The successes of electron-beam lithography in fabricating graphene nanostructures that exhibit semiconducting behavior have highlighted two future challenges. First, in order to open a band gap >>kT in nanostructured graphene, it must be nanopatterned to critical dimensions <20 nm. However, 20 nm is on the threshold of what can easily be achieving using conventional electon beam lithography due to known electron scattering effects in common electron-beam resists. More recently with an experimental electron beam resist system features down to 10 nm have been demonstrated. (See, Miyazaki, T.; Hayashi, K.; Kobayashi, K.; Kuba, Y.; Ohyi, H.; Obara, T.; Mizuta, O.; Murayama, N.; Tanaka, N.; Kawamura, Y.; Uemoto, H. *J. Vac. Sci. Technol. B* 2008, 26, 2611.) However the second challenge is that, electron-beam lithography is a serial technique, which limits its throughput and applicability to the large-area patterning of graphene. Thus, in order to more practically realize nanostructured graphene-based materials, new patterning techniques that can be extended to large-areas with sub-20 nm resolution are needed.

SUMMARY

One aspect of the present invention provides methods for forming a nanoperforated graphene material. The methods comprise forming an etch mask defining an array of holes over a graphene material and patterning the array of holes into the graphene material, wherein the etch mask comprises a wetting layer in contact with the graphene material, a neutral layer comprising a copolymer disposed over the wetting layer, and a pattern-defining copolymer layer disposed over the neutral layer. The nanoperforated graphene material can consist of a single sheet of graphene or a plurality of graphene sheets. For example the graphene material can be highly oriented pyrolytic graphite (HOPG).

In some embodiments of these methods, the wetting layer comprises a self-assembled monolayer (SAM). The SAM is desirably comprised of molecules having a first end that is sufficiently polar to undergo an attractive interaction with the copolymer of the neutral layer and a second end comprising a plurality of conjugated rings that undergo a π-π stacking interaction with the graphene material. For example, the first end of the molecules can comprise an acid group and second end of the molecules can comprise a plurality of fused aromatic rings. An example of a suitable SAM molecule is pyrene butyric acid. In other embodiments, the wetting layer comprises silicon oxide.

Another aspect of the invention provides methods for forming a nanoperforated graphene material, the methods comprising coating a pattern-forming block copolymer onto a graphene material and exposing the deposited pattern-forming block copolymer to a vapor atmosphere saturated with an annealing solvent for a time sufficient to allow the pattern-forming block copolymer to self assemble into oriented domains. At least some of the oriented domains can then be selectively removed to form an etch mask defining an array of holes, which can be patterned into the underlying graphene material. In some embodiments of these methods, the pattern-defining block copolymer comprises a cylinder-forming diblock copolymer of styrene and methyl methacrylate and the annealing solvent comprises carbon disulfide.

Yet another aspect of the invention provides methods for forming a nanoperforated graphene material, the methods comprising forming an etch mask defining an array of holes on a substrate, wherein the etch mask comprises a wetting layer in contact with the substrate, a neutral layer comprising a copolymer disposed over the wetting layer, and a pattern-defining block copolymer layer comprising a plurality of ordered domains disposed over the neutral layer. The wetting layer and the neutral layer are then selectively removed from the etch mask and the pattern-defining block copolymer layer is separated from the substrate. The resulting released pattern-defining block copolymer layer is then transferred onto a graphene material and the array of holes is patterned into that material.

Still another aspect of the invention provides methods for forming a nanoperforated graphene material which include the steps of forming an etch mask over a graphene material, wherein the etch mask comprises a protective layer comprising an uncrosslinked polymer in contact with the graphene material, an etch stop layer disposed over the protective layer, and a pattern-defining block copolymer layer comprising a plurality of ordered domains disposed over the etch stop layer; selectively etching away at least some of the domains to form an array of holes in the pattern-forming block copolymer layer, wherein the etch stop layer is comprised of a material that is resistant to the etchant used to etch away the domains; patterning the array of holes through the etch stop layer, the protective layer and the graphene material in one or more subsequent etching steps; and removing the remaining etch stop layer and protective material from the graphene material. In some embodiments of these methods, the uncrosslinked polymer comprises uncrosslinked polystyrene, the etch stop layer comprises silicon oxide and the pattern-forming block copolymer comprises a cylinder-forming diblock copolymer of styrene and methyl methacrylate. In some such embodiments, the etchants used to etch away at least some of the domains in the pattern-forming block copolymer comprise ultraviolet radiation and an oxygen plasma, the etchant used to pattern the array of holes through the etch stop layer comprises a fluorine-containing gas, and the etchant used to pattern the array of holes through the protective layer and the graphene material comprises an oxygen plasma. Using the present methods, the features of the periodic array of holes (including the hole diameters, hole spacing and/or constrictions between the holes) in the nanoperforated graphene material can be fabricated with dimensions of less than 20 nm, or even less than 10 nm. In some embodiments, the features of the periodic array of holes in the nanoperforated graphene materials are dimensioned such that they provide a semiconducting material having an electronic band gap of at least about 100 meV.

BRIEF DESCRIPTION OF THE DRAWINGS

FIG. 2. Physical and chemical characterization of nanopatterned HOPG. (a) The histogram and distribution of critical feature dimensions. The hole diameter, the period of the repeating pattern, and the constriction width are labeled d, D, and w, respectively. Inset depicts the nanoperforated graphene structure. (b) x-ray photoelectron spectroscopy (XPS) of patterned oxide layer after final $O_2$ plasma RIE step (i), after $CHF_3+O_2$ RIE step and oxide layer removal with HF (ii), after final $O_2$ plasma RIE step and oxide layer removal with HF (iii). (c) Raman scattering of unpatterned HOPG (bottom curve); patterned graphene after $CHF_3+O_2$ RIE step, skipping the final $O_2$ plasma RIE step, and oxide layer removal with HF (middle curve); and patterned graphene following the full procedure depicted in FIG. 1 including the final $O_2$ plasma RIE step and oxide layer removal with HF (top curve).

FIG. 3. Electronic characterization. (a) Schematic of the nanoperforated graphene field effect transistor device. (b) Top-down SEM image of a fabricated device. Scale bar=100 nm. (c) Measured graphene conductance versus gate bias for a device before nanopatterning measured at room temperature (dashed curve); device after nanopatterning but before final $O_2$ RIE step measured at room temperature (dotted curve); device after nanopatterning and after final $O_2$ RIE step measured at room temperature (dash/dotted curve) and at T=105 K (solid curve). (d) Minimum conductance versus 1/T fit to a straight line, indicating that an effective gap of 102 meV has opened as a result of nanopatterning. Insert shows the source-drain current as a function of source drain bias at $V_G$-$V_{Dirac}$=−30, −20, −10, and 0 V, from bottom to top, respectively, at 105 K.

DETAILED DESCRIPTION

One aspect of the invention provides methods for nanopatterning graphene materials using block copolymer (BCP) lithography. BCP lithography can be facilely scaled to batch-process multiple, large-area substrates in parallel while simultaneously achieving the high-fidelity patterning of exceptionally small features, including features with dimensions of less than 10 nm. The resulting material is a novel form of nanopatterned graphene referred to as nanoperforated graphene. In one basic embodiment of the methods, nanoperforated graphene materials are fabricated using a diblock copolymer-based etch mask to transfer the pattern of a periodic array of holes into an underlying grapheme substrate via selective and controlled etching. Because the present methods can be implemented and scaled to large areas and can control the electronic properties of graphene, they can also enable practical large-area, commercializable applications of graphene in electronics, thin film electronics, flexible electronics, optoelectronics, nanofiltration, photonics and sensing. The nanopatterned graphene materials may be particularly well-suited for nanofiltration applications because, in some embodiments, they are only an atomic layer in thickness, but still strong enough to withstand considerable pressure. As such, they have minimal impedance to fluid flow - which is highly desired for filtration. In addition, as described below, the hole sizes are tunable. Photonics are another attractive application for the present materials because their band gaps are tunable and, therefore, can be tailored to absorb/emit/detect light at various energies depending on the pore size and periodicity and the details of their structure.

Materials that can be patterned with the present methods include single graphene sheets and materials that include a plurality of graphene sheets. For example, the present methods can be used to pattern HOPG which has interlayer bonds, or other forms of multilayered graphite or graphene.

The dimensions of the pattern transferred into the graphene material can be characterized by the diameters of the holes, the hole spacing (as measured between hole centers) and/or the widths of the constrictions between the holes. In some embodiments, the present methods can be used to form a pattern of holes in which one, two, or all three of these dimensions are less than about 40 nm. This includes embodiments in which one, two, or all three of these dimensions are less than about 30 nm, further includes embodiments in which one, two, or all three of these dimensions are less than about 20 nm, and still further includes embodiments in which one, two, or all three of these dimensions are less than about 10 nm. Using the present methods, the dimensions of the pattern in the nanoperforated graphene material can be tailored to provide a semiconducting material. For example, nanoperforated graphene materials having an electronic band gap of at least about 100 meV can be fabricated. These dimensions can be tailored by altering the molecular weight of the BCP from which the etch masks are made, as illustrated in Example 2, below. Typically, reducing the molecular weight of the BCP leads to reduced etching dimensions.

The BCP lithography-based methods can produce nanoperforated graphene materials with large nanoperforated areas. For example, in some embodiments the materials have a nanoperforated area of at least 1 mm$^2$.

In one embodiment, the etch mask used in the methods can be fabricated from a multilayered structure that includes a wetting layer, a neutral layer disposed over the wetting layer and a pattern-defining layer disposed over the neutral layer.

The wetting layer is a thin film of material that serves to improve the wetting of the neutral layer on the graphene material, thereby preventing the dewetting of the overlying pattern-defining layer that would otherwise occur. The use of this layer is advantageous due to the poor wettability of graphene by solvents and polymers used to form the other layers of the etch mask. In some embodiments, silicon oxide is used as the wetting layer. This wetting layer can be deposited directly onto the graphene material and is typically quite thin For example, in some embodiments the wetting layer has a thickness about 5 to 20 nm, although thicknesses outside of this range may also be employed.

Wetting layers made from self-assembled monolayers (SAMs) can also be used. The molecules making a SAM wetting layer are organic molecules characterized by a first end that is sufficiently polar to undergo an attractive interaction with an overlying neutral layer. In some embodiments, the first end of the molecules comprises an acid group, such as a carboxyl group. The second end of the molecules comprising the SAM are characterized in that they are capable of undergoing an attractive interaction, such as a $\pi$-$\pi$ stacking interaction, with the conjugated rings of the underlying graphene. This interaction should be sufficiently strong to prevent the SAM from being washed away by solvents used in processing the etch masks. In some embodiments the second end of the molecules comprises a conjugated ring system, desirably composed of three or more aromatic rings, such as fused six-member aromatic rings (e.g., benzene rings). One example of a suitable second end group is pyrene and one example of a suitable molecule for a SAM wetting layer is pyrene butyric acid (PBA). An advantage of replacing an oxide layer with a SAM as the wetting layer is that it can eliminate the need for more than one etchant during the fabrication of the etch mask. For example, for masks in which each of the layers (i.e., the wetting layer, the neutral layer and the pattern-defining layer) is comprised of organic materials, the masks can be etched through with an $O_2$ plasma, without the need to resort to more caustic etchants, such as fluorine-containing gases. Another advantage of SAM-based wetting layers is that they provide greater tunability of the wettability.

The neutral layer is formed from a material that induces pattern formation in the overlying block copolymer pattern-defining layer. For example, in one embodiment the neutral layer induces the formation of cylindrical domains within the overlying block copolymer layer, as described in greater detail in Example 1, below. The neutral layer material can be a copolymer polymerized from vinyl monomers and acrylate monomers. An example of one such copolymer is a random copolymer of methyl methacrylate (MMA), styrene (S) and glycidyl methacrylate (GMA), P(S-r-MMA-r-GMA). The ratios of the monomers that make up the neutral layer polymer can vary, depending on the desired characteristics of the etch mask pattern. By way of illustration only, in some embodiments, the weight percent of styrene in a P(S-r-MMA-r-GMA) neutral layer ranges from about 70 to 85 percent, the weight percent of polymethyl methacrylate in a P(S-r-MMA-r-GMA) neutral layer ranges from about 10 to 30 percent, and the weight percent of glycidyl methacrylate in a P(S-r-MMA-r-GMA) neutral layer ranges from about 2 to 5 percent.

The block copolymer pattern-defining layer forms a periodic pattern due to the phase segregation of the copolymer into a regular pattern of domains. Block copolymers from which the pattern-defining layer can be formed include block copolymers of vinyl monomers and acrylate monomers. For example, the pattern-defining layer can be formed from a block copolymer of styrene and methylmethacrylate, P(S-b-MMA) which forms vertically oriented, hexagonally-packed cylindrical domains. The molecular weight of the components that make up the pattern-forming layer polymer can vary, depending on the desired characteristics of the etch mask pattern. By way of illustration only, in some embodiments, the number average molecular weight of the polystyrene in a P(S-b-MMA) pattern-forming layer ranges from about 20,000 to 50,000, while the number average molecular weight of the polymethyl methacrylate ranges from about 8,000 to 25,000.

An etch mask can be formed from the multilayered structure by selectively removing (e.g., etching) domains in the block copolymer layer to provide a pattern-defining layer that defines an array of holes corresponding to the domain pattern in the block copolymer layer and etching the array into the remaining layers of the etch mask. The resulting pattern can then be transferred into the underlying graphene material, as illustrated in the examples, below.

In some embodiments of the present methods, both the wetting layer and the neutral layer can be eliminated from the etch mask structure by using a solvent anneal to deposit the pattern-forming layer directly onto the graphene substrate. During the solvent anneal, the BCP film undergoes swelling as it is exposed to a saturated solvent vapor atmosphere, typically at room temperature (28° C.), for a time sufficient to allow the BCP to self-assemble into oriented domains. In some embodiments the solvent anneal is conducted for at least 8 hours. This includes embodiments in which the solvent annealing is conducted for at least 10 hours. Certain aspects of these embodiments can be attributed to the inventors' discovery that solvents, such as carbon disulfide ($CS_2$) can be used as annealing solvents to create a cylindrical domain polymer morphology in a P(S-b-MMA) BCP on graphene. Other annealing solvents include tetrahydrofuran (THF), acetone, chloroform, tolune, and mixtures thereof. The solvent annealing method is illustrated in greater detail in Example 3, below. Parameters that effect the development of morphology by solvent annealing are polymer-solvent interaction parameters ($\chi_{P-S}$), the film thickness and the exposure time to solvent vapors. By way of illustration, for the $CS_2$, these parameters may be as follows: ($\chi_{PS-S}$=0.43, $\chi_{PMMA-S}$=1.2), PS-selective solvent, swells PS block preferentially. For other solvents such as, THF ($\chi_{PS-S}$=0.34, $\chi_{PMMA-S}$=0.88), acetone ($\chi_{PS-S}$=1.1, $\chi_{PMMA-S}$=0.29), chloroform ($\chi_{PS-S}$=0.39, $\chi_{PMMA-S}$=0.45), and toluene ($\chi_{PS-S}$=0.34, $\chi_{PMMA-S}$=0.45). Mixed solvent vapors can also be used to change the morphology of block copolymer thin films on graphene. A film thickness less than (½ $L_0$) is typically preferred to form morphology without defects. Furthermore, exposure time can be optimized to avoid dewetting of the film from the substrate, which can occur if the exposure time is too long. (See, Xuan, Yu.; Peng, J.; Cui, L.; Wang, H.; Li, B.; Han, Y. *Macromolecules* 2004, 37, 7301-7307; Peng, J.; Kim, D. H.; Knoll, W.; Xuan, Y.; Li, B.; Han, Y. *J. Chem. Phys.* 2006, 125, 064702.)

Figure 6:
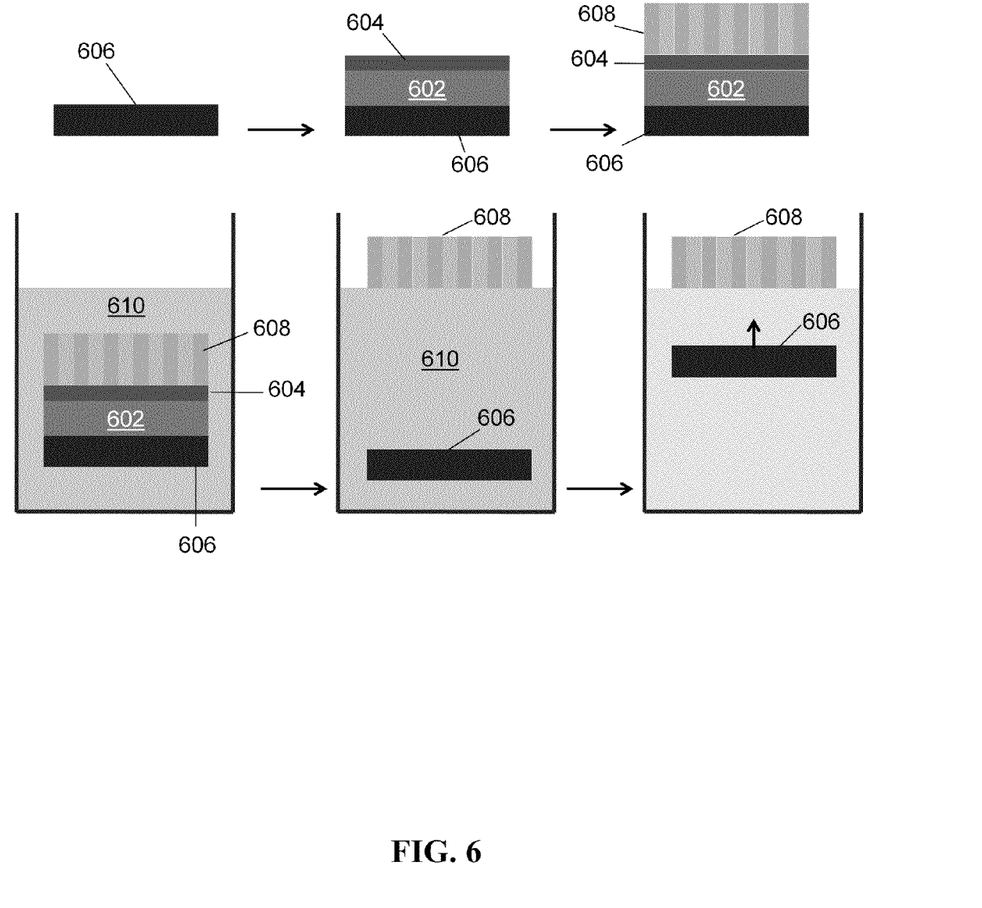
FIG. 6. Schematic illustration of the direct transfer of a pattern-forming block copolymer layer onto an underlying graphene substrate.

In other embodiments of the present methods, a wetting layer and a neutral layer are used to create a pattern-forming layer having the desired morphology, but the wetting layer and neutral layer are removed prior to the selective removal of domains to form the final etch mask pattern. This approach is illustrated schematically in FIG. 6. As shown in the figure, a wetting layer 602 and a neutral layer 604 are deposited onto an underlying graphene substrate 606. A BCP pattern-forming layer 608 is then deposited over the neutral layer, where it assembles into a series of domains forming a pattern in the layer. The structure can then be immersed in a liquid or vapor phase solution 610 capable of removing (e.g., etching away) the wetting layer and the neutral layer. The remaining, released pattern-forming layer can then be transferred directly back on to the graphene substrate 606.

Figure 7:
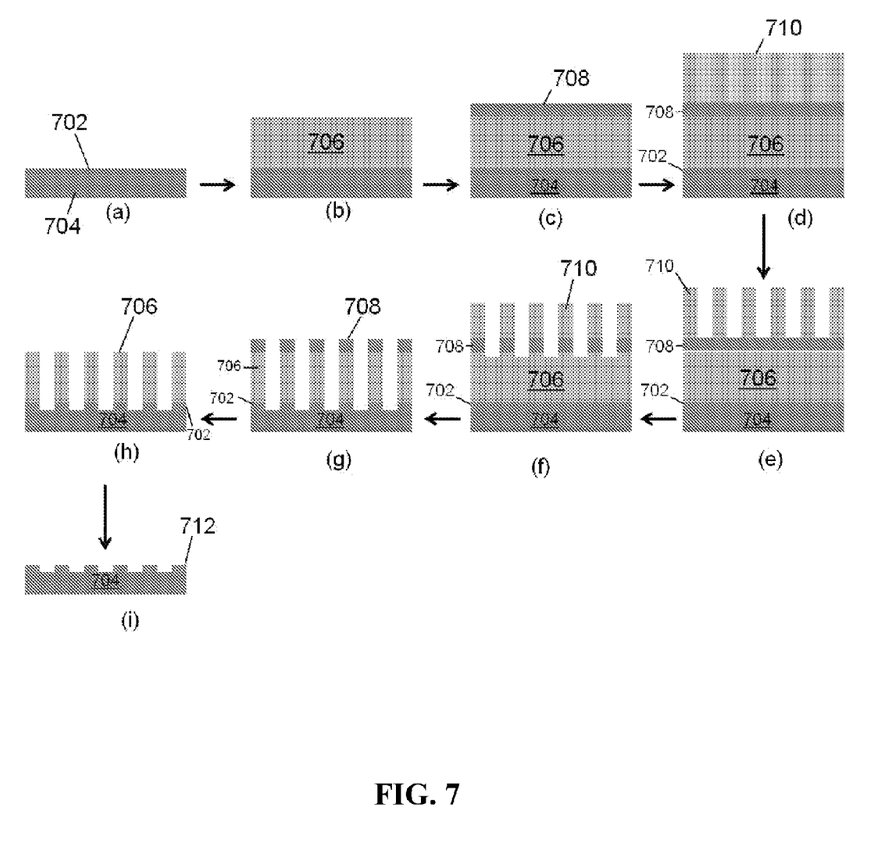
FIG. 7. Schematic illustration of the tri-layered approach to forming nanopatterned graphene, as described in Example 5.

Various devices, such as field effect transistors (FETs), can be fabricated from the nanoperforated graphene made using the present etch mask structures and methods. In some instances, components, such as metal contacts, can be deposited onto the graphene substrate prior to patterning. However, in other instances it is desirable to deposit such components after the patterning of the graphene is complete. In such instances, a variation of the methods, referred to as the "tri-layer approach" can be used. This approach takes advantage of the pattern-forming layer transfer technique, described above, and inserts a "protective layer" over the graphene substrate to protect the graphene from etchants used during the processing of the etch mask and to facilitate the complete the removal of the etch mask from the graphene after patterning is complete. The tri-layer process is described in detail in Example 5, below. FIG. 7 provides a schematic illustration of the tri-layer approach. In a first step, graphene 702 is deposited (e.g., spin-coated) onto a device substrate 704 (panel (a)). A layer of protective material 706 is subsequently deposited over the graphene (panel (b)). This protective material is desirably an organic material, such as uncrosslinked polystyrene, that prevents etchants used during the processing of the etch mask from reaching the underlying graphene and that can be readily removed from the graphene after patterning. A hard mask layer 708, such as an $SiO_2$ layer, is then deposited over the protective layer (panel (c)). This hard mask layer serves as an etch-stop for etchants, such as an $O_2$ plasma, used to selectively etch domains in the pattern-forming BCP layer and also prevents the crosslinking of the underlying protective layer during the UV etching of the pattern-forming BCP layer. The pattern-forming BCP 710 is disposed on the hard mask layer (panel (d)). After the selective removal of domains in the pattern-forming BCP (panel (e)), the resulting pattern can be transferred through the hard mask layer using a suitable etchant (panel (f)). The pattern then can be transferred through the remaining protective layer and the underlying graphene (panel (g)) using a different etchant system. Finally, the remaining portions of hard layer are removed (panel (h)), followed by the removal of the protective layer 712 (panel (i)), leaving a nanoperforated graphene layer on a device substrate.

EXAMPLES

Example 1

Nanopatterning Graphene Using an Etch Mask with a Silicon Oxide Wetting Layer

Figure 4:
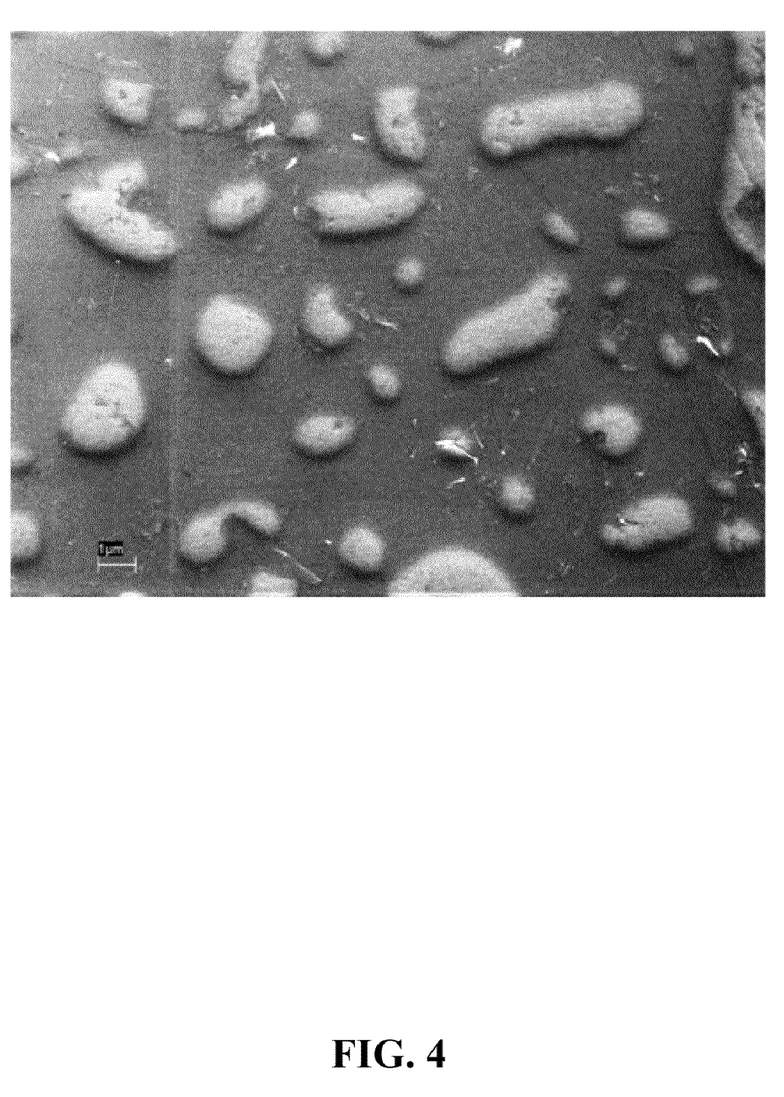
FIG. 4. Top-down SEM image of dewetted P(S-b-MMA) thin film. The random copolymer was formed by direct deposition of P(S-r-MMA-r-GMA) solution on to the surface of HOPG.

In this example, a thin-film of the cylinder-forming diblock copolymer poly(sytrene-block-methyl methacrylate)[P(S-b-MMA)] is used as a template to form nanoperforated graphene. In order to ensure the lateral phase segregation of the diblock copolymer into vertically orientated cylinders on the graphene surfaces, two intermediate layers were deposited on graphene. The first layer was a 10 nm silicon oxide film which improved the wetting of the second layer, and the second layer consisted of a thin film of a random copolymer of methyl methacrylate (MMA), styrene (S) and glycidyl methacrylate (GMA), P(S-r-MMA-r-GMA), (See, Han, E.; In, I.; Park, S. M.; La, Y. H.; Wang, Y.; Nealey, P. F.; Gopalan, P. *Adv. Mater.* 2007, 19, 4448.) which acted as a non-preferential or neutral layer. The intermediate random copolymer neutral layer adjusts the interfacial energies between the PS and PMMA blocks of the diblock copolymer and the underlying substrate leading to vertical orientation of the cylindrical domains for patterning. (See, Huang, E.; Pruzinsky, S.; Russell, T. P.; Mays, J.; Hawker, C. J. *Macromolecules* 1999, 32, 5299-5303.) As shown in FIG. 4, without the silicon oxide film, the direct deposition of the P(S-r-MMA-r-GMA) on HOPG substrates resulted in non-uniform coating and hence subsequent dewetting of the overlying block copolymer film upon thermal annealing.

The P(S-r-MMA-r-GMA) random copolymer was synthesized by nitroxide-mediated living free radical polymerization as described in the literature. (See, Han, E.; Stuen, K. O.; La, Y. H.; Nealey, P. F.; Gopalan, P. *Macromolecules* 2008, 41, 9090-9097.) The composition of P(S-r-MMA-r-GMA) random copolymer was calculated by NMR analysis (S: 70%, MMA: 26%, GMA: 4%). Number averaged molecular weight and PDI of synthesized P(S-r-MMA-r-GMA) were 46,700 g/mol, and 1.2, respectively. P(S-b-MMA) was used as the cylinder forming diblock copolymer ($Mn_{PS}$=46,000 g/mol, $Mn_{PMMA}$=21,000 g/mol, PDI=1.09) and was purchased from Polymer Source, Inc. and used as received. Highly Oriented Pyrolytic Graphite (HOPG), Optigraph GmbH (Germany), was used as a source for graphene. Initially, in proof-of-principle experiments, BCP lithography directly on the HOPG substrates was studied. In subsequent experiments, mechanically exfoliated graphene monolayers were patterned on $SiO_2$/Si substrates via BCP lithography to characterize the electronic properties of the nanopatterned graphene.

To pattern HOPG, first, a 10 nm silicon oxide layer was deposited onto freshly cleaved HOPG from a $SiO_2$ source (Telemark e-beam dielectric evaporator, Pressure: $<2\times10^{-6}$ torr, deposition rate: 1 Å/sec). A solution of P(S-r-MMA-r-GMA) in toluene (0.3 wt %) was then spin-coated on the silicon oxide buffer at 4,000 rpm and annealed at 160° C. under vacuum for 3 hours. The annealed sample was washed in toluene to remove uncrosslinked random copolymers, resulting in a 10 nm thick crosslinked P(S-r-MMA-r-GMA) neutral layer.

Figure 1:
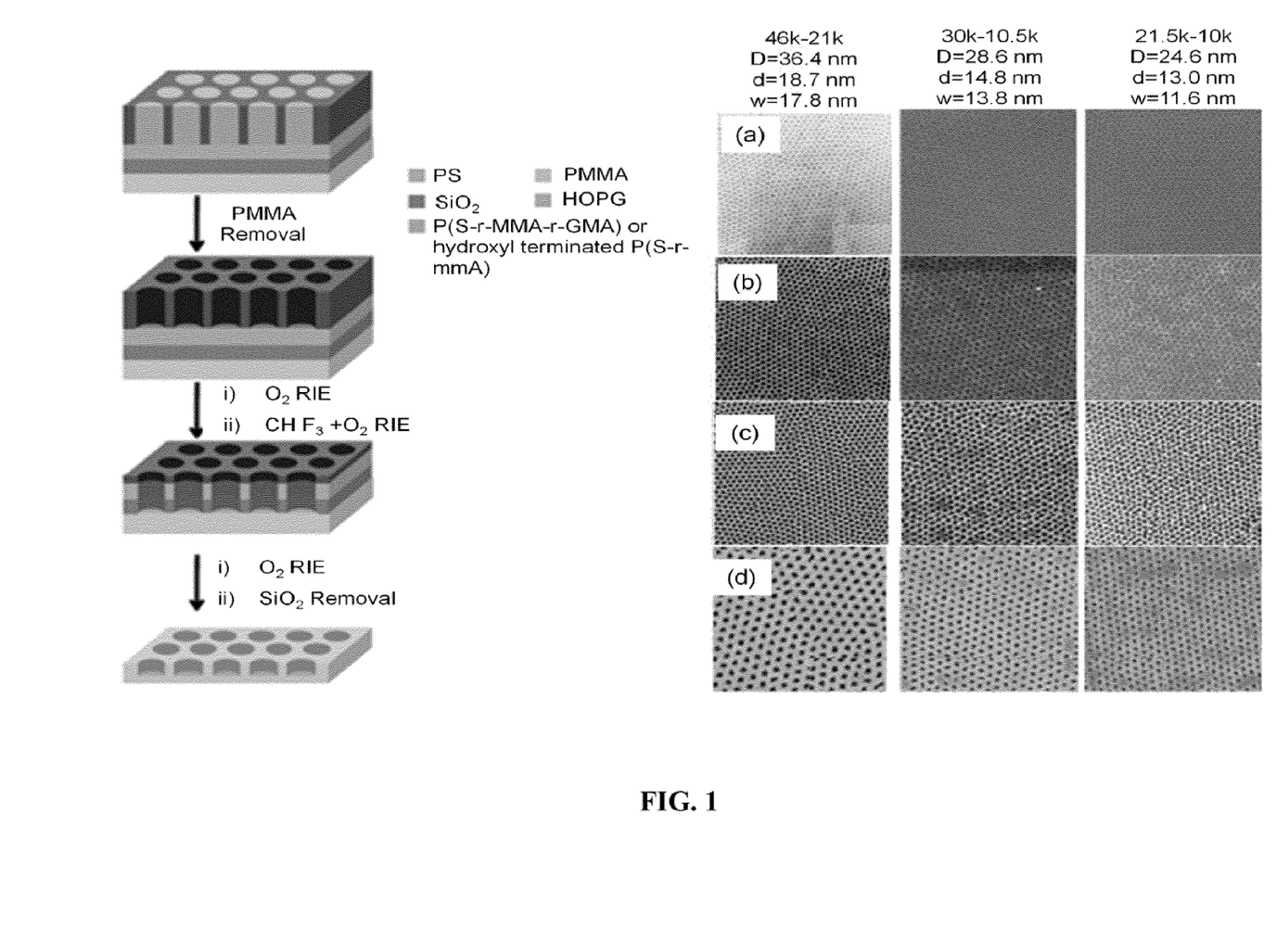
FIG. 1. (Left Panel) Schematic depicting the fabrication of nanoperforated HOPG using block copolymer lithography and the corresponding top-down scanning electron microscope (SEM) images of (a) vertically oriented polymethylmethacrylate (PMMA) cylinders in a block copolymer thin film obtained by thermal annealing, (b) residual polystyrene (PS) honeycomb template obtained after selective PMMA removal with UV irradiation, (c) etched structures after $O_2$ followed by $CHF_3+O_2$ plasma reactive ion etch (RIE) resulting in the etching of the random copolymer mat and the oxide buffer layer respectively, and (d) nanoperforated HOPG resulting from the final $O_2$ plasma RIE and the removal of the oxide buffer by HF solution.

Next, a block copolymer P(S-b-MMA) solution in toluene (1 wt %) was spin-coated at 4,000 rpm onto the random copolymer-covered graphene and annealed (220° C., vacuum, 3 hours) resulting in a 25 nm thick film. A hexagonal array of vertically oriented PMMA cylinders was observed at this stage (FIG. 1a). The sample was then exposed to UV illumination (1000 mJ/cm$^2$) to selectively degrade the PMMA cylinders. PMMA residue was removed by dipping in acetic acid for 30 minutes and rinsed with DI water. Overall, this process yielded a hexagonally ordered nanoporous PS template (FIG. 1b).

An $O_2$ plasma RIE (50 W, 10 mT, 10 sccm) was utilized to remove the underlying P(S-r-MMA-r-GMA). The measured etch rates for PS and P(S-r-MMA-r-GMA) were 1.17 nm/sec and 1.42 nm/sec, respectively. $CHF_3$ and $O_2$ mixed plasma RIE was then used to etch the oxide buffer layer. The etch rates of PS, P(S-r-MMA-r-GMA), and the oxide buffer were 0.76 nm/sec, 0.96 nm/sec, and 1.09 nm/sec, respectively when a mixed gas system (300 W, 60 mT, $CHF_3$ 45 sccm and $O_2$ 5 sccm) was used. FIG. 1c shows that the honeycomb pattern, as well as the size of the hole (d) and the hole-to-hole period (D) were preserved between layers. Subsequently, the underlying HOPG was etched by $O_2$ plasma RIE (15 s). A 10% HF aqueous solution was used to liftoff the oxide buffer layer. FIG. 1d shows the bare patterned HOPG following the removal of the polymers and oxide. The mode values of d, D, and graphite nanoribbon constriction width (w) were 18.7 nm, 36.4 nm, and 17.8 nm, respectively as analyzed from the histogram using the ImageJ image analysis program (FIG. 2a).

The nanoperforated HOPG was further characterized by x-ray photoelectron spectroscopy (XPS) and Raman spectroscopy. XPS spectra were collected from 0 eV to 1000 eV using a Mg Ka X-ray source. Raman spectroscopy was performed with a 4 mW 633 nm HeNe laser source with <1 µm$^2$ spot size, and spectra were calibrated to the Si 520 cm$^{-1}$ peak. The XPS peaks Si2p (100 eV), Si2s (155 eV) and O1s (532 eV) observed before HF treatment (FIG. 2bi), are attributed to the oxide buffer layer. After the removal of the oxide buffer, the Si peaks disappear, the intensity of O1s peak decreases and the intensity of C1s peak (286 eV) increases (FIG. 2biii). The disappearance of the Si peaks confirms the complete removal of the oxide following the 10% HF aqueous treatment. The remaining O1s peak suggests that the edges of the perforations in the HOPG are oxygen terminated as a result of the $O_2$ plasma etch or exposure to ambient. To investigate the edge terminations during the intermediate, the XPS spectrum of patterned HOPG following the $CHF_3$+$O_2$ mixed plasma RIE was measured. The final $O_2$ plasma etch step was eliminated but the oxide was removed with 10% HF aqueous solution. The presence of F1s (689 eV) peak and O1s (534 eV) peak confirms the termination of the hole edges are by F and O at this stage of processing (FIG. 2bii).

Raman Spectroscopy was used as a non-destructive tool for probing the edges and the crystalline sp$^2$-bonded structure of the HOPG after nanopatterning. (See, Ferrari, A. C. *Solid State Comm.* 2007, 143, 47-57.) Prior to patterning, the G-(~1580 cm$^{-1}$) and 2D-(~2600-2700 cm$^{-1}$) bands were prominent (FIG. 2c). Generally, G-band scattering results from the degenerate $E_{2g}$ phonon at the Brillouin zone center, which is sensitive to doping in graphite, and the 2D-band is a double resonance feature of the zone-boundary phonon around the K and K' points, which is also responsible for the singlet D-band. The D phonon is not Raman-active in HOPG and becomes active through double resonance or through a defect in the crystal such as a vacancy, edge, or grain boundary. Thus, the intensity of the D-band is a probe of disorder or edges.

Figure 2:
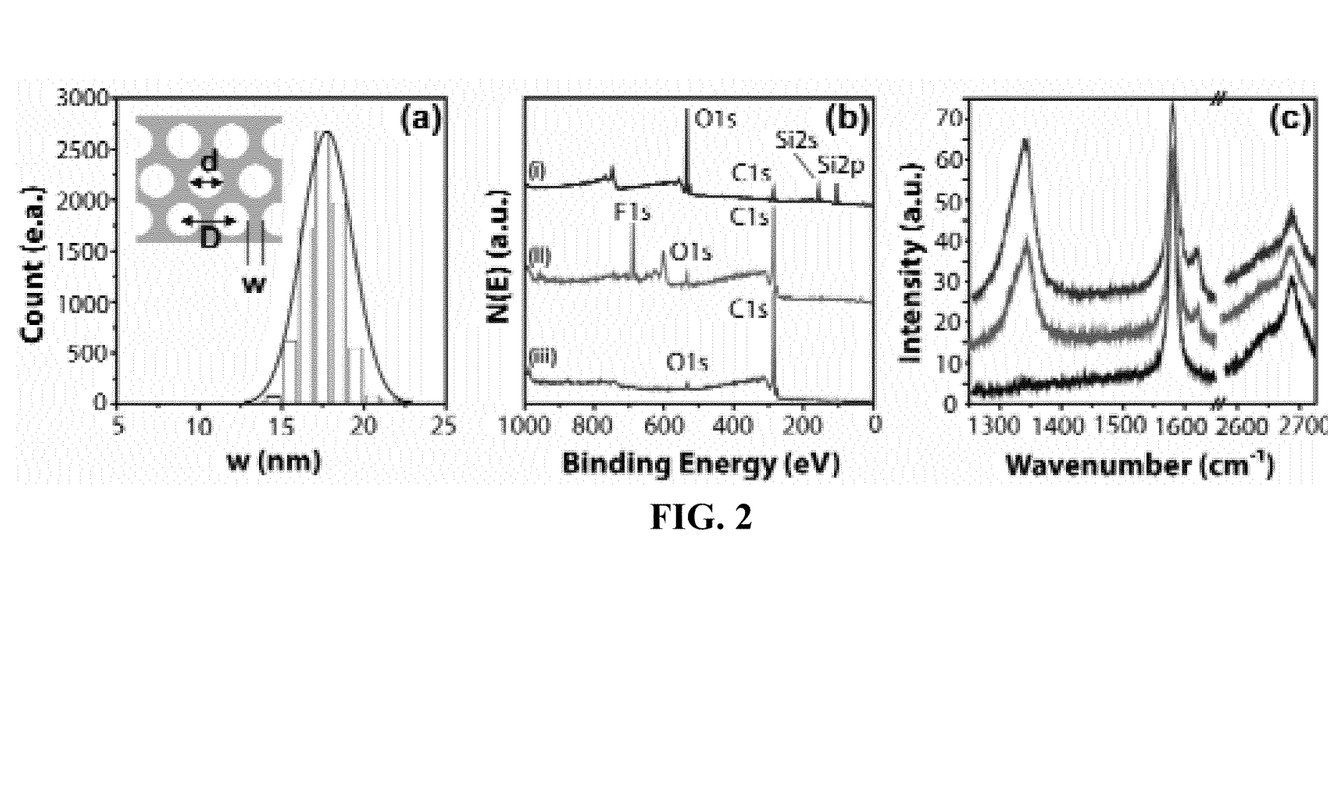

After nanopatterning, the intensity of the D-band (linear combination of Lorentzians at 1318 and 1338 cm$^{-1}$) significantly increases (FIG. 2c). Edge-disorder induced D'-band scattering (1613 cm$^{-1}$) is also detected due to intravalley double-resonance scattering. The D-band confirms that the BCP pattern has been transferred through the intermediate layers and that the perforations have been etched into the HOPG resulting in ubiquitous edges. The G-band and 2D-band show no shift compared with the unpatterned HOPG sample, indicating that the nanoperforated graphene, away from the edges, is not heavily doped and remains crystalline.

After characterizing the physical and chemical structure of the nanoperforated HOPG, the electronic properties of single sheets of nanoperforated graphene monolayers were studied to investigate the effects of quantum confinement and edge defects on their electronic structure. Field effect transistor (FET) device geometries were utilized to measure conductance and charge transport mobility as a function of carrier concentration.

To fabricate the devices, graphene was mechanically exfoliated onto 86 nm $SiO_2$/Si (p++) wafers. (See, Blake, P.; Hill, E. W.; Neto, A. H. C.; Novoselov, K. S.; Jiang, D.; Yang, R.; Booth, T. J.; Geim, A. K. *Appl. Phys. Lett.* 2007, 91, 063124.) Monolayer pieces were identified by optical phase contrast using predetermined correlations of optical contrast with measured spectral shifts of the Raman 2D band corresponding to mono-, bi-, and multiple layers of graphene. (See, Ferrari, A. C. *Solid State Comm.* 2007, 143, 47-57.) The degenerately doped Si substrate and the $SiO_2$ were used as the gate electrode and dielectric of the FETs, respectively. Four electrodes spaced at 1.2 µm (thicknesses: 4 nm Cr/26 nm Au/4 nm Ti) contacted the graphene. The top Ti layer prevented sputtering of Au during subsequent etching.

Figure 3:
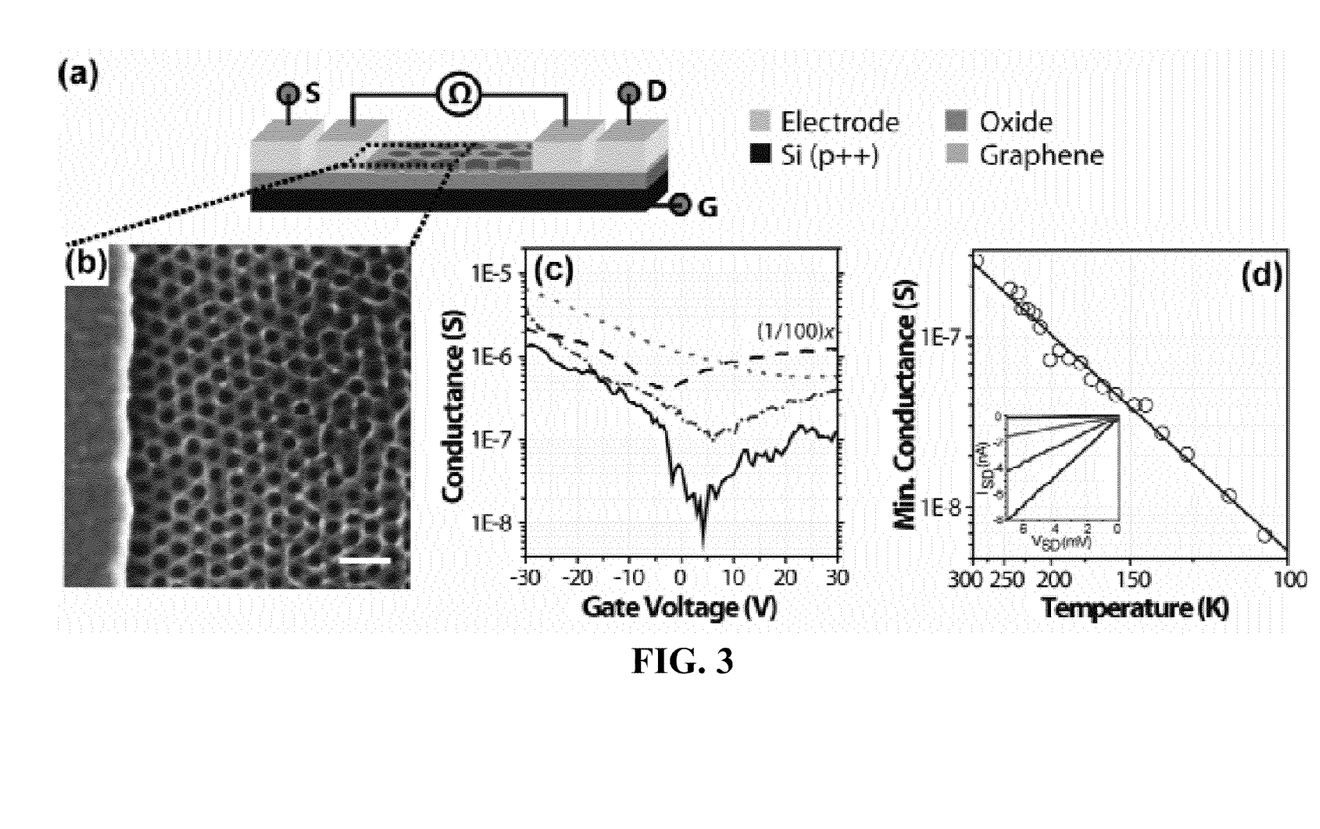

After electrode patterning, 10 nm of silicon oxide was deposited on the graphene (220° C. substrate, 50 µl torr $O_2$ backfill) to ensure copolymer wetting. To pattern the graphene monolayers, the final $O_2$ plasma etch was shortened to 5 s and the HF etch was eliminated to prevent device liftoff. Low temperature measurements were performed using a He cryostat at 105 K at 2E-4 ton, and room temperature measurements were performed in ambient. At room temperature, a four-wire geometry was utilized to eliminate the graphene/electrode contact resistances (FIG. 3a).

Figure 5:
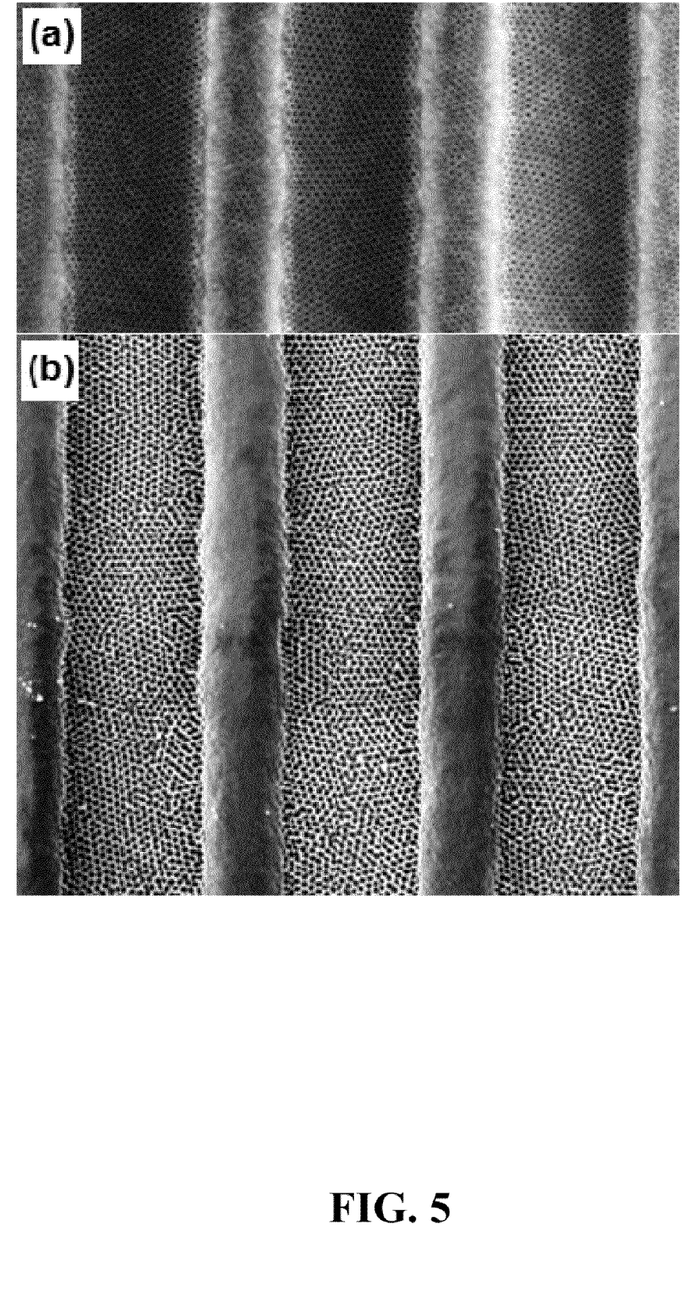
FIG. 5. Large area SEM images of (a) perpendicular PMMA cylinders on a graphene material substrate. (b) Honey comb structures after final short $O_2$ plasma RIE step.

The graphene-based devices (FIG. 3b and FIG. 5) were electrically characterized at the various stages of the nanopatterning processing. Prior to patterning and to silicon oxide deposition, the devices showed excellent charge transport characteristics and high mobility (>2,000 cm$^2$ V-1 s$^{-1}$) at room temperature (FIG. 3c). The Cr/Au/Ti electrodes provided ohmic contacts with contact resistances of 200-1000 ohms/μm$^2$. The graphene devices showed moderate hole-doping (as evidenced by the shift in the Dirac point) potentially due to extrinsic impurities such as air molecule adsorption or residual PMMA. (See, Chen, J. H.; Jang, C.; Xiao, S. D.; Ishigami, M.; Fuhrer, M. S. *Nat. Nanotechnol.* 2008, 3, 206-209.) The conductance ON/OFF modulation for gate biases in the range of ±30 V was ~8 at room temperature. For gate potentials far from the Dirac point, the mobility of all unpatterned devices (extracted from σ=nqμ) was constant as a function of carrier concentration.

Following the deposition of the silicon oxide buffer layer, the charge transport mobility significantly decreased to 220 cm2 V$^{-1}$ s$^{-1}$. The ON/OFF conductance ratio was 6.4. BCP deposition, UV etching, and PMMA removal had no significant effect on the sample's electrical properties. The subsequent CHF$_3$ etching step, intended to etch through the oxide buffer layer, decreased the absolute conductivity of the graphene (~⅟₆₀) but increased the ON/OFF conductance ratio to ~12 (FIG. 3c). Following the CHF$_3$ etch, the Dirac point shifted >30V, indicating significant hole-doping potentially as a result of edge fluorination (see F trace in FIG. 2Cii). Because of the large shift in the Dirac point, the full ON/OFF ratio was not measured.

Subsequent O$_2$ plasma etching, which was intended to fully etch the holes in the graphene, shifted the Dirac point back towards neutrality allowing measurement of a larger ON/OFF conductance ratio of 41. The same device measured at T=105 K demonstrated an increased ON/OFF ratio of ~207 with lower ON conductivity (FIG. 3c).

The enhanced switching ratio of the nanoperforated graphene compared to that of unpatterned graphene strongly suggests that an electronic band and/or transport gap has been opened in the patterned material as a result of quantum confinement, edge, and localization effects in the constrictions. To characterize the effective gap of the nanoperforated graphene, the measured OFF conductance was related to an effective gap by assuming that the OFF conductance varies as the thermally-activated carrier concentration, which scales with temperature as ~exp(-E$_G$/2k$_B$T), where E$_G$ is the effective gap. The experimentally measured OFF conductance follows an Arrhenius relationship with temperature, indicating that the opening of an effective gap of 102 meV as a result of the nanopatterning (FIG. 3c).

For comparison purposes, the nanoperforated graphene device with 18 nm constrictions can be approximated as a mesoscopic honeycomb network of nanoribbons with constriction widths ~18 nm in which the ribbons are interconnected between larger graphene islands. Tight-binding calculations of graphene nanoribbons predict multiple families of electronic band structure with significantly different band gap dependencies depending on the exact width and orientation. For example, nanoribbons of width 18 nm have predicted band gaps of 0-60 meV. (See, Castro Neto, A. H.; Guinea, F.; Peres, N. M. R.; Novoselov, K. S.; Geim, A. K. *Rev. Mod. Phys.* 2009, 81, 109-162.) More rigorous ab initio studies that more closely match published experimental data on graphene nanoribbons have shown that all orientations of ribbons should have a significant band gap. The ab initio calculations predict band gaps of 80-250 meV for 18 nm ribbons, depending on orientation. (See, Yang, L.; Park, C. H.; Son, Y. W.; Cohen, M. L.; Louie, S. G. *Phys. Rev. Lett.* 2007, 99, 186801.) Tight-binding calculations have also been developed to model the band gap of graphene anti-dot lattices similar to the present nanoperforated graphene membranes. The anti-dot lattice calculations predict a 67 meV band gap for the nanoperforated structure. (See, Pedersen, T. G.; Flindt, C.; Pedersen, J.; Mortensen, N. A.; Jauho, A. P.; Pedersen, K. *Phys. Rev. Lett.* 2008, 100, 136804.) The effective gap of 102 meV, measured here, qualitatively compares well with these calculations of the expected band gap.

Previous experimental studies have empirically correlated the observed switching ratio and electronic band gap of graphene nanoribbons transistors with the width of the nanoribbons. Han et al. have shown that 24 nm ribbons have a switching ratio of 20 at T=100 K, suggesting a band gap of 27 meV. (See, Han, M. Y.; Ozyilmaz, B.; Zhang, Y. B.; Kim, P. *Phys. Rev. Lett.* 2007, 98, 206805.) Furthermore, Lin et al. have demonstrated that 30 nm ribbons have a switching ratio of 9 at T=90 K, suggesting a band gap of 46 meV. (See, Lin, Y. M.; Perebeinos, V.; Chen, Z. H.; Avouris, P. *Phys. Rev. B* 2008, 78, 161409.) In comparison, the measured effective gap of 102 meV exceeds these experimentally measured band gaps for comparable constrictions.

In addition to the opening of an electronic band gap resulting from quantum confinement effects, experimental and theoretical work has also shown that large conductance modulations in graphene nanoribbons can arise at low temperatures by several mechanisms other than an electronic band gap. Nominal edge roughness in carbon nanostructures has been theorized to cause Coulomb blockade, strong localization leading to Anderson insulator-like behavior, (see, Mucciolo, E. R.; Neto, A. H. C.; Lewenkopf, C. H. *Phys. Rev. B* 2009, 79, 075407), and the formation of quasi-localized mid-gap states (see, Vanevic, M.; Stojanovic, V. M.; Kindermann, M. *Phys. Rev. B* 2009, 80, 045410) leading to a transport gap (see, Pereira, V. M.; dos Santos, J.; Castro, A. H. *Phys. Rev. B* 2008, 77, 115109). Analysis of these effects is complex in the present system because of the large number of percolating current paths that exist in the nanoperforated graphene membranes. The abrupt conductance modulations (see, Sols, F.; Guinea, F.; Neto, A. H. C. *Phys. Rev. Lett.* 2007, 99, 166803) near the Dirac point at T=105 K in FIG. 3c may indicate the formation of local resonances in the constrictions of the nanoperforated graphene giving rise to Coulomb blockade-like behavior, which has been experimentally demonstrated in graphene nanocontrictions. (See, Stampfer, C.; Gutttinger, J.; Hellmueller, S.; Molitor, F.; Ensslin, K.; Ihn, T. *Phys. Rev. Lett.* 2009, 102, 056403; Ponomarenko, L. A.; Schedin, F.; Katsnelson, M. I.; Yang, R.; Hill, E. W.; Novoselov, K. S.; Geim, A. K. *Science* 2008, 320, 356-358.)

It is believed that the observed conductance modulation is due mainly to the opening of a sizable electronic band gap rather than Coulomb blockade or localization effects. This hypothesis is supported by the observed Arrhenius temperature dependence of the conductance, which matches the dependence expected for a traditional semiconductor with a band gap of 100 meV. Furthermore, this hypothesis is supported by the observation of the enhanced switching ratio of the nanoperforated graphene at room temperature, and the agreement of the 100 meV extracted gap with the theoretical predictions of a quantum-confined band gap. Regardless of the mechanism, the effect of nanopatterning the graphene is clear: an effective gap of 100 meV opens up, enabling conductance modulation >40 and >200 at room temperature and at T=105 K, respectively.

Finally, to assess the relevance of nanoperforated graphene in potential device applications, the hole mobility of the FETs was estimated using a standard transistor model (μ=gL/V$_D$sC$_{ox}$W), where g is the transconductance, L and W are the channel length and width of the original graphene sheet, respectively, $V_{SD}$ is the source-drain potential, and $C_{ox}$ is the gate capacitance per unit area. The calculation describes the sheet mobility of the entire nanoperforated graphene layer and sets a lower bound to the mobility of the individual nanoconstrictions. After $O_2$ plasma etching, the device demonstrates a hole mobility of 1 cm$^2$ V$^{-1}$ s$^{-1}$ at low drain bias (10 mV) at room temperature. This value compares favorably with the free carrier mobility of other thin film materials such as amorphous silicon, random percolating nanotube networks, and organic semiconductors.

Example 2

Tailoring the Pattern Dimensions in Graphene by Altering the Molecular Weight of the Blocks in the Pattern-Forming BCP Layer This example demonstrates how the dimensions of the pattern in a sheet of nanopatterned graphene can be reduced by reducing the molecular weights of the polymer blocks in a BCP pattern-forming layer. Specifically, although smaller constriction widths can be achieved with the high molecular weight BCPs utilized in Example 1 by overetching during pattern transfer, a better approach to achieving smaller constriction widths is to use BCPs with smaller molecular weights. BCPs with smaller molecular weights enable both smaller constrictions and smaller periodicities, and therefore large materials fill factor resulting in potentially higher electrical current densities and higher mechanical strength. Furthermore, better reliability and reproducibility can be achieved by avoiding overetching.

For this example, two additional P(S-r-MMA-r-GMA) random copolymers were synthesized by nitroxide-mediated living free radical polymerization as described in the literature. (Han, E.; Stuen, K. O. ; La, Y. H.; Nealey, P. F.; Gopalan, P. 2008, 41, 9090-9097.) The composition of P(S-r-MMA-r-GMA) random copolymers were calculated by NMR analysis. The resulting compositions of the random copolymers were S: 82%, MMA: 14%, GMA: 4% (PG4-82) and S: 77%, MMA: 19%, GMA: 4% (PG4-77), respectively. Two kinds of P(S-b-MMA) block copolymers were used as the cylinder forming diblock copolymers (Mn$_{PS}$=30,000 g/mol, Mn$_{PMMA}$=10,500 g/mol, PDI=1.08, and Mn$_{PS}$=21,500 g/mol, Mn$_{PMMA}$=10,000 g/mol, PDI=1.06). These were purchased from Polymer Source, Inc. and used as received. Highly Oriented Pyrolytic Graphite (HOPG), Optigraph GmbH (Germany), was used as a source for graphene.

To pattern HOPG, first, a 10 nm silicon oxide layer was deposited onto freshly cleaved HOPG from a SiO$_2$ source (Telemark e-beam dielectric evaporator, Pressure: <2×10$^{-6}$ ton, deposition rate: 1 Å/sec). A solution of PG4-82 in toluene (0.3 wt %) was then spin-coated on the silicon oxide wetting layer at 4,000 rpm. In addition, a solution of PG4-77 in toluene (0.3 wt %) was spin-coated on the silicon oxide wetting layer at 4,000 rpm. They were annealed at 160° C. under vacuum for 3 hours. The annealed samples were washed in toluene to remove uncrosslinked random copolymers, resulting in a 10 nm thick crosslinked PG4-82 and PG4-77 neutral layer.

Next, 30k-10.5k P(S-b-MMA) solution in toluene (0.8 wt %) was spin-coated at 4,000 rpm onto the PG4-82 coated graphene and annealed (160° C., vacuum, 24 hours) resulting in a 22 nm thick film. 21.5k-10k P(S b-MMA) solution in toluene (0.8 wt %) was spin-coated at 4,000 rpm onto the PG4-77 covered graphene and annealed (160° C., vacuum, 24 hours) resulting in a 20 nm thick film. The samples were then exposed to UV illumination (1000 mJ/cm$^2$) to selectively degrade the PMMA cylinders. PMMA residue of those samples was removed by dipping in acetic acid for 2 minutes and rinsed with DI water.

$O_2$ plasma RIE (50 W, 10 mT, 10 sccm) was utilized to remove the underlying random copolymer layers. CHF$_3$ and $O_2$ mixed plasma RIE (300 W, 60 mT, CHF$_3$ 45 sccm and O$_2$ 5 sccm) was then used to etch the oxide buffer layer. Subsequently, the underlying HOPG was etched via an O$_2$ plasma RIE. A 10% HF aqueous solution was used to liftoff the oxide buffer layer.

The results of these studies are shown in FIG. 1, which shows SEM images of (a) vertically oriented polymethylmethacrylate (PMMA) cylinders in the block copolymer thin films, (b) residual polystyrene (PS) honeycomb templates obtained after selective PMMA removal with UV irradiation, (c) etched structures after O$_2$ followed by CHF$_3$+O$_2$ plasma reactive ion etch (RIE) resulting in the etching of the random copolymer mat and the oxide buffer layer respectively, and (d) nanoperforated HOPG resulting from the final O$_2$ plasma RIE and the removal of the oxide wetting layer by HF solution.

Example 3

Nanopatterning Graphene Using an Etch Mask with a SAM Wetting Layer

This example demonstrates the use of a SAM as a wetting layer in a graphene etch mask used to fabricate a perforated graphene-based FET.

Single layer graphene was mechanically exfoliated onto 86 nm SiO$_2$/Si (p++) wafers. Monolayer pieces were identified by optical phase contrast using predetermined correlations of optical contrast with measured spectral shifts of the Raman G' band corresponding to mono-, bi-, and multiple layers of graphene. The degenerately doped Si substrate and the SiO$_2$ were used as the gate electrode and dielectric of the FETs, respectively. Four electrodes spaced at 1~1.2 µm (thicknesses: 4 nm Cr/26 nm Au/4 nm Cr) were defined by e-beam lithography and thermal metal evaporation to contact the graphene.

1-Pyrene butyric acid (97%) was purchased from Aldrich and used as received. To form a self-assembled monolayer of 1-pyrene butyric acid on the graphene, graphene FET devices were immersed in 10 mM solution of 1-pyrene butyric acid in ethyl alcohol for 24 hrs. The treated devices were washed with ethyl alcohol.

Then, 0.3 wt % toluene solutions of P(S-r-MMA-r-GMA) random copolymers, (PG4-70, PG4-77 and PG4-82) were spin-coated on 1-pyrene butyric acid/graphene devices and annealed at 160° C. under vacuum for 3 hrs. The annealed samples were washed in toluene to remove uncrosslinked random copolymers, resulting in a 10 nm thick crosslinked PG4-70, PG4-82 and PG4-77 neutral layer on graphene.

46k-21k P(S-b-MMA) solution in toluene (1 wt %), 30k-10.5k P(S-b-MMA) solution in toluene (0.8 wt %), and 21.5k-10k P(S b-MMA) solution in toluene (0.8 wt %) were spin-coated at 4,000 rpm onto the PG4-70, PG4-82, and PG4-77 coated graphene devices, respectively. 46k-21k block copolymer sample was annealed at 220° C. under vacuum for 2 hrs. The samples of 30k-10.5k and 21.5k-10k P(S-b-MMA) were annealed at 160° C. under vacuum for 24 hrs. Annealed samples were then exposed to UV illumination (1000 mJ/cm$^2$) to selectively degrade the PMMA cylinders. PMMA residue of those samples was removed by dipping in acetic acid for 2 minutes and rinsed with DI water.

$O_2$ plasma RIE (50 W, 10 mT, 10 sccm) was utilized to remove the underlying random copolymer layers and to etch through graphene to fabricate a nanoperforated structure.

Figure 8:
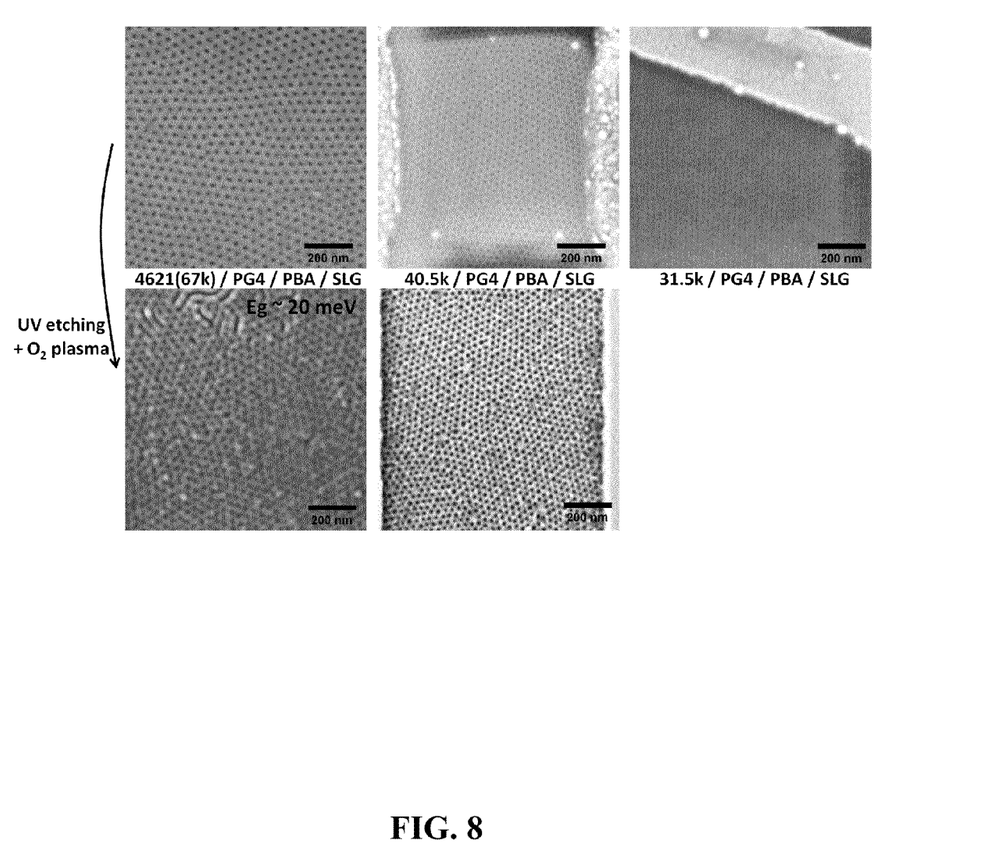
FIG. 8 SEM images of etch masks comprising pyrene butyric acid SAM wetting layers on graphene (top panels) and nanoperforated graphene layers patterned using the etch masks (bottom panels), in accordance with Example 3.

The results of these studies are presented in FIG. 8, which shows SEM images of the resulting etch masks on graphene (top panels) and the nanoperforated graphene after the removal of the etch mask (bottom panels).

Example 4

Solvent Annealing

This example demonstrates the use of solvent annealing to form an etch mask for nanopatterning graphene.

Single layer graphene was mechanically exfoliated onto 86 nm $SiO_2$/Si (p++) wafers. Monolayer pieces were identified by optical phase contrast using predetermined correlations of optical contrast with measured spectral shifts of the Raman G' band corresponding to mono-, bi-, and multiple layers of graphene. The degenerately doped Si substrate and the $SiO_2$ were used as the gate electrode and dielectric of the FETs, respectively. Four electrodes spaced at 0.3~0.35 μm (thicknesses: 4 nm Cr/26 nm Au/4 nm Cr) were defined by e-beam lithography to contact the graphene.

PMMA cylinder forming P(S-b-MMA) block copolymer was synthesized by living anionic polymerization. Number average molecular weights of PS block and PMMA block of the copolymer were 15,000 g/mol and 10,000 g/mol, respectively. A solution of P(S-b-MMA) block copolymer in toluene (0.8 wt %) was spin-coated at 4,000 rpm on mechanically exfoliated graphene FET device. The film was placed in a $CS_2$-saturated annealing chamber at room temperature for 10 hrs to expose block copolymer thin film to $CS_2$ vapor. During the exposure to $CS_2$ vapor, perpendicular PMMA cylindrical structure was formed. The sample was then exposed to UV illumination (1000 $mJ/cm^2$) to selectively degrade the PMMA cylinders. PMMA residue of those samples was removed by dipping in acetic acid for 1 minutes and rinsed with DI water. An $O_2$ plasma RIE (50 W, 10 mT, 10 sccm) was utilized to etch through graphene to fabricate nanoperforated structure.

Example 5

Three-Layered Approach for Large Area Nanopatterning

This example demonstrates the "tri-layer" approach for nanopatterning graphene.

Large area graphene synthesis and transfer to $SiO_2$/Si substrate: Large-area monolayer graphene was grown in a horizontal CVD furnace with a 32 mm ID quartz tube. Copper foil (Alfa Aesar, product #13382) was used as the growth catalyst. The foil was heated to 1050° C. under the flow of 900 sccm forming gas (95% argon, 5% hydrogen) and annealed under the same conditions for 30 minutes. The furnace was then cooled to 1020° C., whereupon methane was introduced at 10 ppm and graphene was allowed to grow for 16 hours. The foil was then rapidly cooled at ~10° C./sec to 700° C. and then allowed to cool to room-temperature.

Graphene was transferred to an 86 nm $SiO_2$/Si (p++) wafer by first spinning a solution of PMMA (Microchem, product 950 PMMA 2C) onto the copper foil. Then, the foil was floated on an aqueous solution of 0.2M HCl, 0.2M $FeCl_3$ for 10 hours to dissolve the copper, leaving the PMMA and graphene film floating on the solution. The film was washed with deionized water (DI water) and transferred to a solution of 1:9 HF (49%): DI water, and allowed to etch for 40 minutes. The film was again washed with DI water and allowed to dry on a 86 nm $SiO_2$/Si (p++) wafer. The PMMA film was removed using boiling dichloromethane, and the wafer was then washed with iso-propanol and blown dry with nitrogen, leaving a monolayer graphene film on the $SiO_2$/Si wafer.

Tri-layer BCP pattern on large-area graphene: A tri-layer strategy was used to pattern the large-area graphene. In the tri-layer strategy, the graphene was first covered by a layer of polystyrene—which is referred to as the protective layer. The polystyrene layer was then covered by a $SiO_2$ layer, which we call the hard-mask layer. A BCP layer was formed on a dummy substrate (described below) and then floated onto the graphene/polystyrene/$SiO_2$.

The polystyrene protective layer and the $SiO_2$ hard mask layer served 3 purposes:

(1) Protection. The polystyrene layer acts as protective layer to prevent the direct etching of the graphene by the fluorine gas plasma.

(2) Hole-enlargement: By first patterning holes in the $SiO_2$ hard-mask, it is then possible to controllably enlarge the hole size in the underlying polystyrene protective layer.

(3) Facilitation of post-patterning polystyrene removal: In the absence of the protective layer, the polystyrene layer left over from the original BCP layer is highly cross-linked due to its exposure to the $O_2$ plasma etchant. The cross-linked nature of this polystyrene inhibits its removal which is undesirable because the nanoperforated graphene is then overcoated by an irremovable and insulating polystyrene layer. In contrast, in the tri-layer strategy, the $SiO_2$ hard-mask layer shields the top-surface of the polysytrene from the $O_2$ plasma etchant, preventing its cross-linking Therefore, it can be removed in solvent after pattern transfer into the underlying graphene.

Details of layer deposition and pattern transfer: To form the "protective layer" a solution of polystyrene (Mn=20,000 g/mol) in propylene glycol methyl ethyl acetate was spin-coated at 4,000 rpm onto CVD grown single layer graphene on 86 nm $SiO_2$/Si (p++) wafers and annealed at 140° C. for 5 min to remove residual solvent. A 10 nm silicon oxide layer was deposited onto polystyrene coated graphene sample from a $SiO_2$ source by e-beam evaporation. (Telemark e-beam dielectric evaporator, Pressure: $<2 \times 10^{-6}$ torr, deposition rate: 0.5 Å/sec)

To deposit a block copolymer film on the silicon oxide/PS/graphene substrate, a floating and transferring technique was used in which a BCP film was formed on a separate "dummy" substrate and then transferred to the silicon oxide/PS/graphene substrate. First, PE-CVD (Plasma Therm 74) was performed in order to deposit 150 nm of silicon oxide on a "dummy" silicon wafer. Then, a 1 wt % solution of hydroxyl terminated P(S-r-MMA) random copolymer (S: 70%, MMA: 30%) in toluene was spin-coated at 1,000 rpm, and annealed at 220° C. for 6 hrs under vacuum. Hydroxyl terminated P(S-r-MMA) random copolymer was synthesized as reported earlier. (P. Mansky , Y. Liu , E. Huang , T. P. Russell , C. Hawker, Science 1997, 275, 1458.) The annealed sample was washed with toluene to remove unreacted random copolymers. A block copolymer, 46k-21k, P(S-b-MMA) solution in toluene (1.5 wt %) was spin-coated at 4,000 rpm onto the random copolymer-covered silicon oxide/silicon wafer and annealed at 230° C. under vacuum for 3 hrs, resulting in perpendicular PMMA cylindrical structure of block copolymer thin film.

In order to float the block copolymer film on an air-water interface, a 20% HF aqueous solution was used to remove the random copolymer layer and the $SiO_2$ layer. The floated block copolymer film on air-HF aqueous solution interface was then transferred to DI water. Then, the floated block copolymer film at the air-water interface was picked up with a silicon oxide/PS/graphene substrate, resulting in block copolymer, silicon oxide, and PS trilayer structure on graphene.

The sample was then exposed to UV illumination (1000 mJ/cm$^2$) to selectively degrade the PMMA cylinders. PMMA residue of those samples was removed by dipping in acetic acid for 2 minutes and rinsing with DI water.

$O_2$ plasma RIE (50 W, 10 mT, 10 sccm) was utilized to remove residues inside the holes and the underlying random copolymer layer. $CHF_3$ and $O_2$ mixed plasma RIE (300 W, 60 mT, $CHF_3$ 45 sccm and $O_2$ 5 sccm) was then used to etch the oxide buffer layer. Subsequently, the underlying polystyrene layer and graphene were patterned via $O_2$ plasma RIE (20 W, 15 mT, 8 sccm) with the patterned silicon oxide hard mask. A 1% HF aqueous solution was used to liftoff silicon oxide on polystyrene layer. Finally, NMP, acetone and isopropyl alcohol were used to remove etched polystyrene residue.

Deposition of metal electrodes on top of the nanoperforated graphene: After the BCP removal, gold electrodes were deposited directly on the nanoperforated graphene through a shadow mask. The nanoperforated graphene was then patterned into arrays of channels that were ~120 □m wide and ~12 □m long. To achieve this, a sacrificial copper etch mask was deposited through a shadow mask such that there was a copper layer everywhere that the nanoperforated graphene was to be preserved. Then, the exposed nanoperforated graphene that was not covered by either the gold or copper layers was removed using a 10 sec $O_2$ plasma RIE (50 W, 10 mT, 10 sccm), and subsequently the copper was removed using an aqueous solution of 0.2M HCl, 0.2M $FeCl_3$ for one minute. The nanoperforated graphene was then cleaned using NMP and iso-propanol. This procedure resulted in channels of nanoperforated graphene ~120 □m width and ~12 □m length that were contacted at both ends of the channel by gold electrodes.

As used herein, and unless otherwise specified, "a" or "an" means "one or more." All patents, applications, references, and publications cited herein are incorporated by reference in their entirety to the same extent as if they were individually incorporated by reference.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art, all language such as "up to," "at least," "greater than," "less than," and the like includes the number recited and refers to ranges which can be subsequently broken down into subranges as discussed above. Finally, as will be understood by one skilled in the art, a range includes each individual member.

It is specifically intended that the present invention not be limited to the embodiments and illustrations contained herein, but include modified forms of those embodiments including portions of the embodiments and combinations of elements of different embodiments as come within the scope of the following claims.

What is claimed is:

1. A method for forming a nanoperforated graphene material, the method comprising forming an etch mask defining an array of holes over a graphene material and patterning the array of holes into the graphene material, wherein the etch mask comprises a wetting layer in contact with the graphene material, a neutral layer comprising a copolymer disposed over the wetting layer, and a pattern-defining block copolymer layer disposed over the neutral layer.

2. The method of claim 1, wherein the wetting layer comprises a self-assembled monolayer.

3. The method of claim 2, wherein the self-assembled monolayer comprises molecules having a first end that is sufficiently polar to undergo an attractive interaction with the copolymer of the neutral layer and a second end comprising a plurality of conjugated rings that undergo a π-π stacking interaction with the graphene material.

4. The method of claim 3, wherein the first end of the molecules comprise an acid group and second end of the molecules comprise at least three fused six-member aromatic rings.

5. The method of claim 4, wherein the molecules are pyrene butyric acid molecules.

6. The method of claim 1, wherein the wetting layer comprises silicon oxide.

7. The method of claim 1, wherein the holes in the array of holes have diameters of no greater than about 20 nm.

8. The method of claim 7, wherein the nanoperforated graphene material has a nanoperforated area of at least about 1 mm$^2$.

9. The method of claim 8, wherein the nanoperforated graphene material has an electronic bandgap of at least 100 meV.

10. The method of claim 1, wherein the neutral layer comprises a random copolymer of methylmethacrylate, styrene and glycidyl methacrylate and the pattern-defining copolymer layer comprises a cylinder-forming diblock copolymer of styrene and methyl methacrylate.

11. A method for forming a nanoperforated graphene material, the method comprising coating a pattern-forming block copolymer onto a graphene material, exposing the pattern-forming block copolymer to a vapor atmosphere saturated with an annealing solvent for a time sufficient to allow the pattern-forming block copolymer to self-assemble into oriented domains, selectively removing at least some of the domains to form an etch mask defining an array of holes, and patterning the array of holes into the graphene material.

12. The method of claim 11, wherein the pattern-defining copolymer comprises a cylinder-forming diblock copolymer of styrene and methyl methacrylate and the annealing solvent comprises carbon disulfide.

13. A method for forming a nanoperforated graphene material, the method comprising:
(a) forming an etch mask defining an array of holes on a substrate, wherein the etch mask comprises a wetting layer in contact with the substrate, a neutral layer comprising a copolymer disposed over the wetting layer, and a pattern-defining block copolymer layer comprising a plurality of ordered domains disposed over the neutral layer;
(b) removing the wetting layer and the neutral layer from the etch mask and separating the pattern-defining block copolymer layer from the substrate;
(c) transferring the separated pattern-defining block copolymer layer onto a graphene material; and
(d) patterning the array of holes into the graphene material.

14. The method of claim 13, wherein removing the wetting layer and the neutral layer from the etch mask comprises immersing the etch mask in an etchant solution that selectively etches the wetting layer and the neutral layer.

15. The method of claim 13, wherein the pattern-defining block copolymer layer comprises a cylinder-forming diblock copolymer of styrene and methyl methacrylate.

16. A method for forming a nanoperforated graphene material, the method comprising:
  (a) forming an etch mask over a graphene material, wherein the etch mask comprises a protective layer comprising an uncrosslinked polymer in contact with the graphene material, an etch stop layer disposed over the protective layer, and a pattern-forming block copolymer layer comprising a plurality of ordered domains disposed over the etch stop layer;
  (b) selectively etching away at least some of the domains to form an array of holes in the pattern-forming block copolymer layer, wherein the etch stop layer is comprised of a material that is resistant to the etchant used to etch away the domains;
  (c) patterning the array of holes through the etch stop layer, the protective layer and the graphene material in one or more subsequent etching steps; and
  (d) removing the remaining etch stop layer and protective layer from the graphene material.

17. The method of claim 16, wherein the uncrosslinked polymer comprises uncrosslinked polystyrene, the etch stop layer comprises silicon oxide and the pattern-forming block copolymer comprises a cylinder-forming diblock copolymer of styrene and methyl methacrylate.

18. The method of claim 17, wherein the etchants used to etch away at least some of the domains in the pattern-forming block copolymer comprise ultraviolet radiation and an oxygen plasma, the etchant used to pattern the array of holes through the etch stop layer comprises a fluorine-containing gas, and the etchant used to pattern the array of holes through the protective layer and the graphene material comprises an oxygen plasma.

19. The method of claim 16, wherein the holes in the array of holes have diameters of no greater than about 20 nm.

20. The method of claim 19, wherein the nanoperforated graphene material has a nanoperforated area of at least about 1 $mm^2$.

* * * * *